United States Patent
Klimmey et al.

(10) Patent No.: US 11,340,175 B2
(45) Date of Patent: May 24, 2022

(54) METHOD FOR CHECKING A PRINTING CYLINDER AND A CORRESPONDING ARRANGEMENT

(71) Applicant: MATTHEWS INTERNATIONAL GMBH, Duisburg (DE)

(72) Inventors: Konrad Klimmey, Vreden (DE); Daniel Schmidt, Ahaus (DE)

(73) Assignee: MATTHEWS INTERNATIONAL GMBH, Duisburg (DE)

(*) Notice: Subject to any disclaimer, the term of this patent is extended or adjusted under 35 U.S.C. 154(b) by 304 days.

(21) Appl. No.: 16/494,659

(22) PCT Filed: Mar. 26, 2019

(86) PCT No.: PCT/DE2019/100280
§ 371 (c)(1),
(2) Date: Sep. 16, 2019

(87) PCT Pub. No.: WO2019/210899
PCT Pub. Date: Nov. 7, 2019

(65) Prior Publication Data
US 2021/0333221 A1    Oct. 28, 2021

(30) Foreign Application Priority Data
May 4, 2018 (DE) .......................... 102018110749.8

(51) Int. Cl.
*G01N 21/956* (2006.01)
*G01N 21/952* (2006.01)
(Continued)

(52) U.S. Cl.
CPC ..... *G01N 21/952* (2013.01); *G01N 21/95607* (2013.01); *G06T 7/001* (2013.01);
(Continued)

(58) Field of Classification Search
CPC .......... G01N 21/952; G01N 21/95607; G01N 2021/8825; G06T 7/001;
(Continued)

(56) References Cited

U.S. PATENT DOCUMENTS

| 4,484,522 A | * | 11/1984 | Simeth | ........ B41F 13/12 |
| | | | | 101/181 |
| 6,523,467 B2 | * | 2/2003 | Fangmeyer | ........ B41C 1/04 |
| | | | | 101/32 |

(Continued)

FOREIGN PATENT DOCUMENTS

| CN | 104251864 A | 12/2014 |
| DE | 3714011 A1 | 2/1988 |

(Continued)

OTHER PUBLICATIONS

International Search Report (in German) and Written Opinion (in German) issued in PCT/DE2019/100280, dated Jun. 26, 2019; ISA/EP.

(Continued)

*Primary Examiner* — Isiaka O Akanbi
(74) *Attorney, Agent, or Firm* — Harness, Dickey & Pierce, P.L.C.

(57) ABSTRACT

The invention relates to a method for checking a printing cylinder for defects in an engraved cylinder surface of the printing cylinder, comprising the steps:
  capturing a first and at least one further digital image of a cylinder surface of a printing cylinder by means of an optical capture unit, wherein the cylinder surface is cleaned before capturing the at least one further image,
  comparing the digital images each with a digital engraving master of the printing cylinder, the comparing comprising:
  determining deviations between each of the digital images and the digital engraving master, and
(Continued)

checking the determined deviations for matching deviations between the digital images, wherein a pseudo defects is concluded if no matching deviations between the digital images have been detected when comparing, and wherein an engraving defect on the printing cylinder is concluded in the case of matching deviations. Furthermore, a corresponding arrangement is described.

12 Claims, 14 Drawing Sheets

(51) Int. Cl.
*G06T 7/00* (2017.01)
*G01N 21/88* (2006.01)

(52) U.S. Cl.
CPC ............ *G01N 2021/8825* (2013.01); *G06T 2207/30144* (2013.01)

(58) Field of Classification Search
CPC ....... G06T 2207/30144; B41F 33/0027; B41F 13/10; B41C 1/04; G01B 11/24; G01B 11/28
USPC ............................................ 356/237.1–237.6
See application file for complete search history.

(56) References Cited

U.S. PATENT DOCUMENTS

| | | |
|---|---|---|
| 10,131,283 B2 | 11/2018 | Roychoudhury |
| 2001/0015142 A1* | 8/2001 | Fangmeyer ............... B41C 1/04 101/32 |
| 2007/0089625 A1* | 4/2007 | Grinberg ............. B41F 33/0027 101/484 |
| 2007/0181024 A1* | 8/2007 | Tabuchi ................ B41C 1/1075 101/401.1 |
| 2007/0240597 A1* | 10/2007 | Grinberg ................ B41F 13/10 101/484 |
| 2017/0246853 A1* | 8/2017 | Kodama .................. B41F 9/00 |
| 2018/0086274 A1 | 3/2018 | Roychoudhury |
| 2019/0246005 A1 | 8/2019 | Fergen et al. |

FOREIGN PATENT DOCUMENTS

| | | |
|---|---|---|
| DE | 4439953 A1 | 5/1996 |
| DE | 102017105704 B3 | 8/2018 |
| DE | 102018201794 B3 | 4/2019 |
| EP | 1785275 A2 | 5/2007 |
| JP | H11142342 A | 5/1999 |
| JP | 2002254590 A | 9/2002 |
| JP | 2007040732 A | 2/2007 |
| WO | WO-2008049510 A1 | 5/2008 |

OTHER PUBLICATIONS

U.S. Appl. No. 16/078,167, filed Aug. 21, 2018, Daniel Schmidt.

* cited by examiner

METHOD FOR CHECKING A PRINTING CYLINDER AND A CORRESPONDING ARRANGEMENT

CROSS-REFERENCE TO RELATED APPLICATIONS

This application is a 371 U.S. National Phase of International Application No. PCT/DE2019/100280, filed on Mar. 26, 2019, which claims the benefit of German Application No. 10 2018 110 749.8, filed on May 4, 2018. The entire disclosures of the above applications are incorporated herein by reference.

BACKGROUND

This section provides background information related to the present disclosure which is not necessarily prior art.

Technical Field

The invention relates to a method for checking a printing cylinder for defects in a cylinder surface of the printing cylinder, preferably in an engraved cylinder surface of the printing cylinder, and to an arrangement for carrying out the method, which are known from EP 1 785 275 A2. A similar method is also described in WO 2008/049510 A1.

Discussion

For the production of printing cylinders, quality control is a major cost factor due to its manual execution. A particular disadvantage exists when defects are discovered at a very late stage of production. Therefore, the aim is to reduce defects on the one hand and to detect defects at an earlier stage on the other. This makes it possible to forego a subsequent press proof process for defect detection.

From the above-mentioned state of the art, methods are known in which images of the printing cylinder surface are taken after different steps in the production of the printing cylinder, which are then each compared with a reference image. For example, after coating and polishing the printing cylinder, a first image is taken to detect defects in the polished material. Another image is taken after an engraving procedure in order to detect defects in the large number of cells produced. A further image is taken after a low-wear coating or chroming has been applied to the printing cylinder.

The known methods have the disadvantage that the images taken by the printing cylinders can sometimes show defects which are not due to faulty spots in the printing cylinder but have a different origin. Dirt, in particular dust particles, may have deposited on the cylinder surface before the images are taken. Such so-called non-reproducible pseudo defects are then incorrectly included in the evaluation of the printing cylinder surface and accordingly lead to an incorrect result.

SUMMARY

This section provides a general summary of the disclosure, and is not a comprehensive disclosure of its full scope or all of its features.

It is therefore the aspect of the invention to further develop a method for checking a printing cylinder and an arrangement suitable for carrying out the method in such a way that it is highly accurate and, in particular, permits the reliable exclusion of pseudo defects.

Accordingly, the method of the preferred embodiment comprises the steps:
  capturing a first and at least one further digital image of a cylinder surface of a printing cylinder by means of an optical capture unit, wherein the cylinder surface is cleaned before capturing the at least one further image,
  comparing the digital images each with a digital engraving master of the printing cylinder, the comparing comprising:
    determining deviations between each of the digital images and the digital engraving master, and
    checking the determined deviations for matching deviations between the digital images,
wherein pseudo defects are concluded if no matching deviations between the digital images have been detected when comparing, and wherein an engraving defect on the printing cylinder is concluded in the case of matching deviations.

Advantageously, the cleaning of the cylinder surface can be carried out manually or contactlessly by applying compressed air, wherein dust particles are removed from the cylinder surface or at least redistributed on the cylinder surface. The cleaning can be carried out, for example, by applying ionized compressed air.

Capturing digital images may also include rotating the printing cylinder, capturing the rotating printing cylinder columnwise using a camera, and moving the camera relatively in the axial direction of the printing cylinder. The camera can be a line scan camera.

Capturing the first and each further digital image may comprise the capturing of at least one bright field image in which the cylinder surface is illuminated at an angle between 0° and 30° to the optical detection axis of the optical capture unit.

In addition, the capturing of the first and each further digital image may comprise capturing at least one dark field image in which the cylinder surface is illuminated at an angle between 30° and 60° to the optical detection axis of the optical capture unit.

Furthermore, the method may comprise the step:
  generating a print-like representation from at least one bright field image of the cylinder surface and at least one dark field image of the cylinder surface, the generating comprising:
    extracting a mask for a non-printing area of the printing cylinder from black areas of the dark field image, and
    applying the mask to the non-printing area of the printing cylinder in the bright field image to adjust the brightness by shifting the white point.

Further, a binary image can also be derived from the dark field image for extracting the mask, wherein in the regions which are black in the dark field image, the average brightness value is determined in the bright field image on the basis of which a brightness adjustment by means of white point shift is carried out.

The method may further comprise the following steps:
  generating a print-like representation from at least one bright field image of the cylinder surface, said generating comprising:
    determining a local maximum of a bright range in the brightness histogram of the at least one bright field image, which bright range is bright compared with a darker range, the bright range corresponding to a non-printing surface area of the printing cylinder;

determining a distance by which the white point is shifted, preferably a multiple of a standard deviation; and shifting the white point in the at least one bright field image by the determined distance.

An arrangement according to the invention for checking a printing cylinder for defects in an engraving of the printing cylinder may have an optical capture unit which is linearly adjustable by means of an adjustment unit along a longitudinal axis of a rotatably mounted printing cylinder, the optical capture unit being directed towards an area to be captured of the printing cylinder surface and being connected to the adjustment unit via a supporting device. The optical capture unit can further have one or more light sources which are alignable or aligned with the area to be captured at different angles to the printing cylinder surface.

Preferably the arrangement also has a cleaning device for cleaning the cylinder surface. The cleaning device may have a compressed air source for contactless cleaning with ionized compressed air.

It is also advantageous if a first of the light sources of the optical capture unit is oriented towards the cylinder surface at an angle of 0° to 30° to the optical detection axis of the optical capture unit.

Moreover, the first light source may be pivotally mounted, wherein the light source is arranged in a first position in the optical detection axis of the optical capture unit and is pivoted out of the optical detection axis of the optical capture unit in a second position.

In addition, at least one other of the light sources of the optical capture unit may be oriented towards the cylinder surface at an angle of 30° to 60° to the optical detection axis of the optical capture unit.

For particularly good illumination, at least one other light source may have two partial light sources arranged opposite and symmetrically to the optical detection axis.

At least one light source may have a rectangular and non-square light exit opening, the longitudinal dimension of which, when oriented towards the cylinder surface, is parallel to the cylinder surface. However, the light source may also have a freely shaped light exit opening.

The image capturing device may also be adjustable in two axes perpendicular to the cylinder axis relative to the cylinder surface. Furthermore, the optical capture unit may comprise a line scan camera which is designed to capture the rotating printing cylinder columnwise.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the following, the invention is explained in more detail using the exemplary embodiments shown in the figures below. The figures show:

DETAILED DESCRIPTION

Example embodiments will now be described more fully with reference to the accompanying drawings.

The aim of the cylinder inspection is to examine printing cylinders for production defects. For this purpose, the surface of the cylinder is optically captured, for example after the last production step, namely chroming, and compared with the reproduction data, which may be available in an engraving file. Deviations between the captured image and the engraving master are then automatically computed and displayed for evaluation.

Another aim of the cylinder inspection is to detect defects in printing cylinder surfaces as early as possible in the production stage. It is possible to carry out the cylinder inspection between each production step or after completion of the printing cylinder.

At the same time, however, the minimization of set-up times is also an important economic aspect, since each further inspection means longer throughput times and increased effort in the workflow. Furthermore, with two inspections, twice the number of machines would have to be available to cover the production volume. Accordingly, a check of the cylinders at the end of production is particularly suitable.

A major problem when taking images is the pollution caused by dust particles, which are difficult to distinguish from actual defects in the subsequent defect evaluation. In order to eliminate a large part of this problem, the method according to the invention involves capturing at least two images of the cylinder surface, with automatic cleaning of the cylinder surface between capturing the images. When evaluating, inspection spots which are only present on one of the images can thus be ignored, since they relate to removed or at least redistributed dirt or dust particles.

Figure 1:
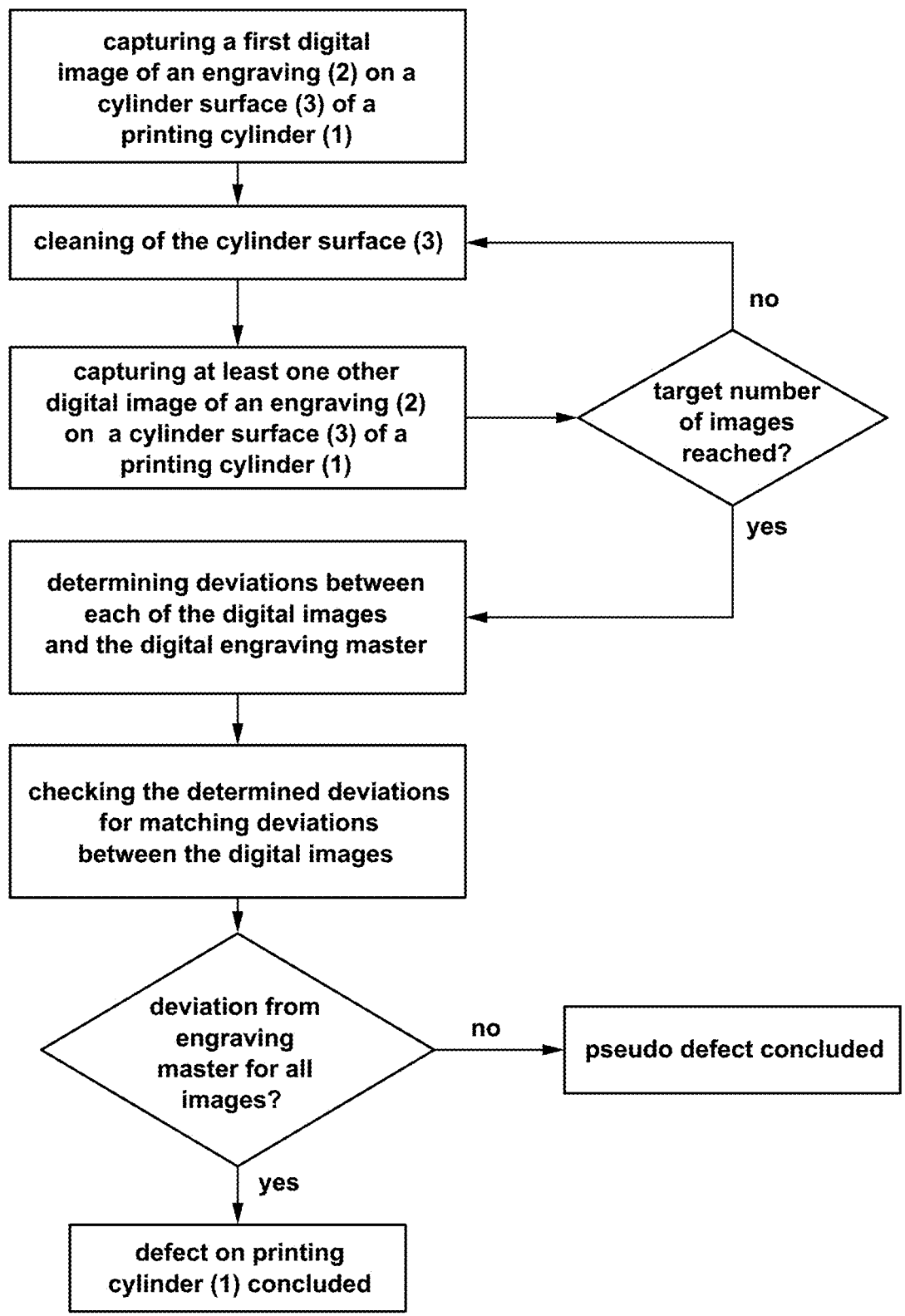
FIG. 1 shows a schematic sequence of the method for checking a printing cylinder according to an embodiment of the invention.

FIG. 1 shows the sequence of the method according to the invention. First, a first digital image of an engraving 2 is captured on a cylinder surface 3 of a printing cylinder 1, for example the printing cylinder can be rotated and captured columnwise with a line scan camera. To remove dirt, the cylinder surface 3 is then cleaned, for example with ionized compressed air. Then at least one further digital image of the engraving 2 is captured. Optionally, further images can be captured, wherein, however, the cylinder surface 3 is cleaned before capturing each at least further image. Then, deviations between each of the digital images and the digital engraving master are determined and the determined deviations are checked for matching deviations between the digital images. If a deviation from the engraving master is visible on all images, a defect on the printing cylinder can be concluded. Otherwise, if a defect is only visible on one of the images, an actual defect can be ruled out, so that this supposed defect is evaluated as a pseudo defect.

Figure 2:
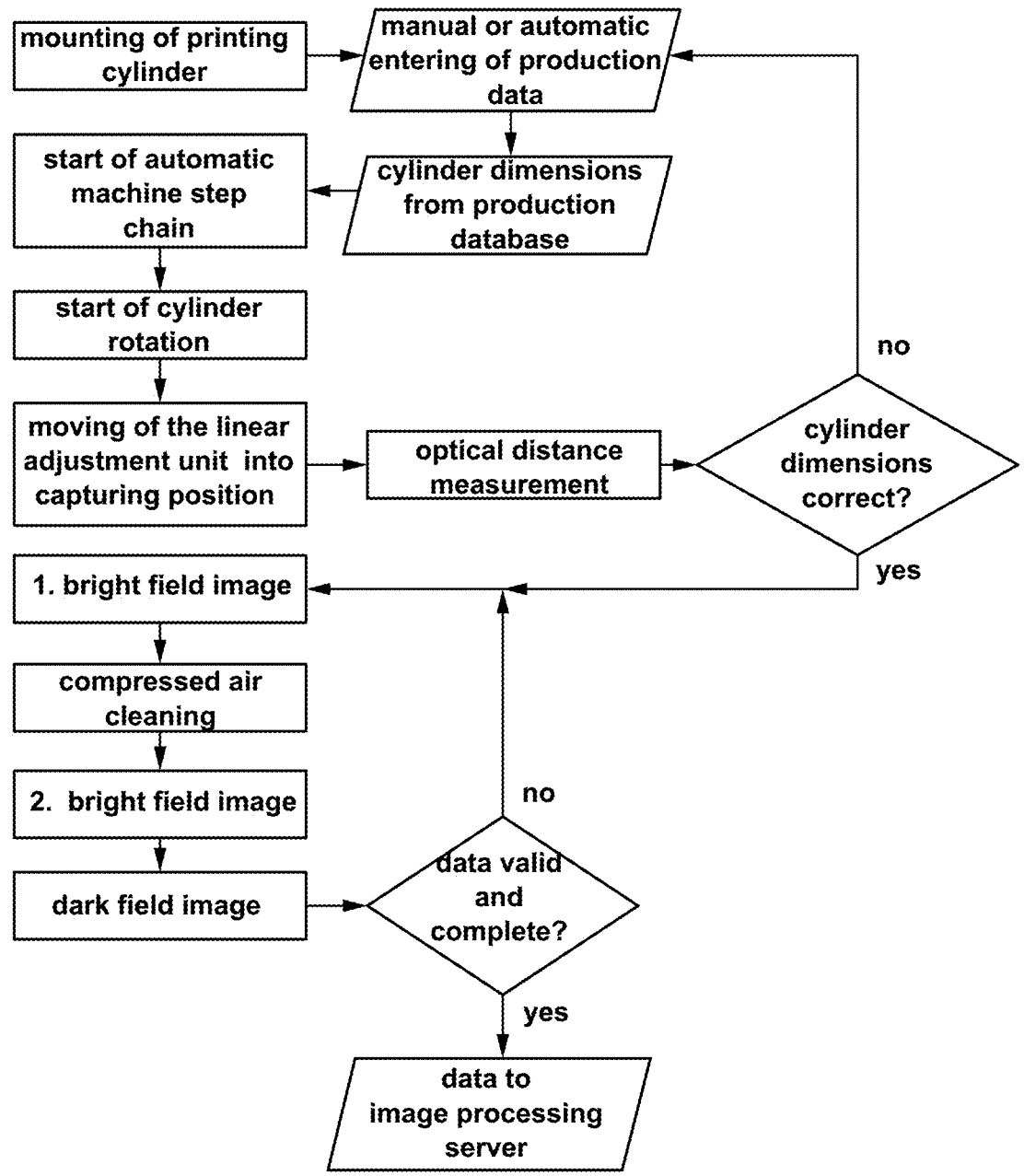
FIG. 2 shows a schematic sequence of the method for checking a printing cylinder according to another embodiment of the invention.

FIG. 2 shows a schematic sequence of another embodiment of the method of inspecting the printing cylinder to check a cylinder surface 3. For this, a printing cylinder 1 to be checked is first mounted in the machine spindle of the testing device. The production data is then entered, whereby the cylinder dimensions in particular are entered into the machine control system. The automatic image capturing is then started at the optical capture unit 4 and the cylinder 1 is set in rotation at the same time. Now the optical capture unit 4 is moved into the capturing position via the linear adjustment unit 10 and an optical distance measurement between the optical capture unit 4 and the printing cylinder surface 3 is carried out. If the dimensions are not correct, the production data is entered manually again. If, on the other hand, the dimensions are correct, capturing of the first bright field image 5 is started. The rotating printing cylinder 1 is captured columnwise by the line scan camera 15 which is moved in axial direction along the printing cylinder 1 by means of the linear adjustment unit 10. For bright field image 5, the illumination is aligned parallel or coaxial to the camera 15 and perpendicular to the cylinder surface 3. After finishing of the first bright field image 5, cleaning of the cylinder surface 3 with ionized compressed air takes place, wherein the compressed air device can also be moved axially along the cylinder 1 via the linear adjustment unit 10. Corresponding to the first bright field image 5, a second bright field image 5 is captured in the same way. For the subsequent dark field image 7, the light source 12.1 used for the bright field image is switched off and the light source 12.2 of the dark field image is switched on. This light source, however, radiates at an angle of 30-60° to the optical detection axis 6 of the optical capture unit 4 on the cylinder surface 3. If the captured data is valid and complete, data processing on the image processing server follows. If the data is invalid or incomplete, however, the image capturing process is restarted with the first bright field image 5. Thereafter, the printing cylinder is removed from the machine spindle. For each of the three image capturing steps, two bright field 5 and one dark field 7, there is now a dataset with the image files of the individual columns. These are then combined to form an overall image of the cylinder surface 3. In addition, a mask for the non-printing area is extracted from the black areas of the dark field image 7. This mask is applied to the bright field image 5 to adjust the white point. For image processing, the three images are adapted to the engraving file using so-called feature points. In the subsequent defect detection, both the two bright field images 5 and the dark field image 7 are used for defect detection, as the different illuminations can make defects visible in different ways as described, so that different features are highlighted. Finally, the computed defects are examined by trained personnel and classified accordingly into "defects" and "no defects".

Figure 3:
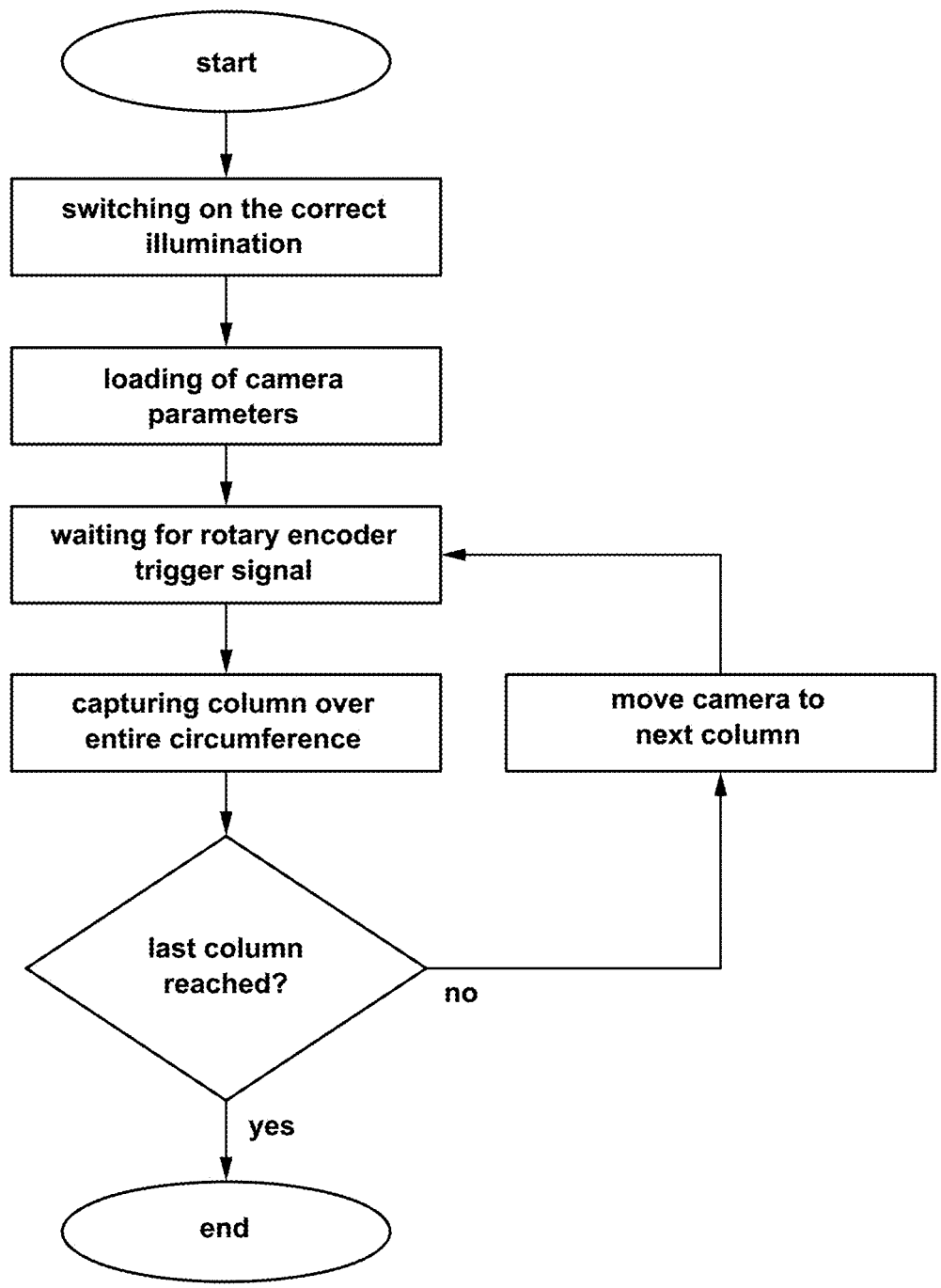
FIG. 3 shows a schematic sequence of the method for capturing an image of a printing cylinder surface.

FIG. 3 shows the sequence of the capturing an image schematically. Depending on the type of image capturing of a bright field or a dark field image 5, 7, the correct illumination is switched on first. The corresponding camera parameters are then loaded. As soon as the rotary encoder sends a trigger signal to the machine spindle, a column is captured over the entire circumference of the cylinder. As soon as the last column is reached, the image capturing process is finished. If the last column has not yet been reached, the camera 15 is moved to the next column and the next column is captured after the rotary encoder signal has been triggered.

Figure 4:
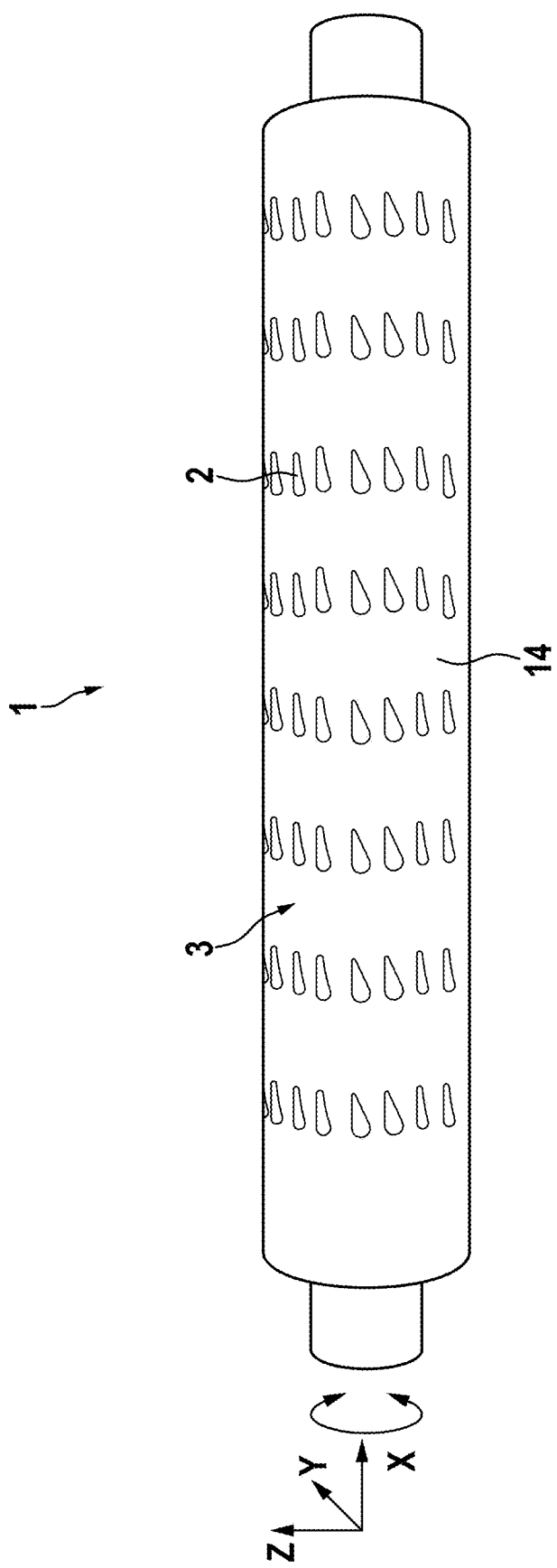
FIG. 4 shows exemplarily an engraved printing cylinder.

FIG. 4 shows an example of a printing cylinder 1 to be checked. It can be seen that the cylinder surface 3 has on the one hand a non-imaged and correspondingly non-printing area 14 and on the other hand an engraving 2 which has a recurring engraving pattern at regular intervals over the width and the entire circumference of the cylinder surface 3. The printing cylinder 1 has a cylinder longitudinal axis X, which is depicted in the shown coordinate system. The axes X, Y and Z also indicate the directions in which the optical capture unit 4 can be adjusted relative to the printing cylinder surface 3 or the printing cylinder 1 respectively. It is also indicated that the impression cylinder 1 can be rotated in two opposite directions.

Figure 5:
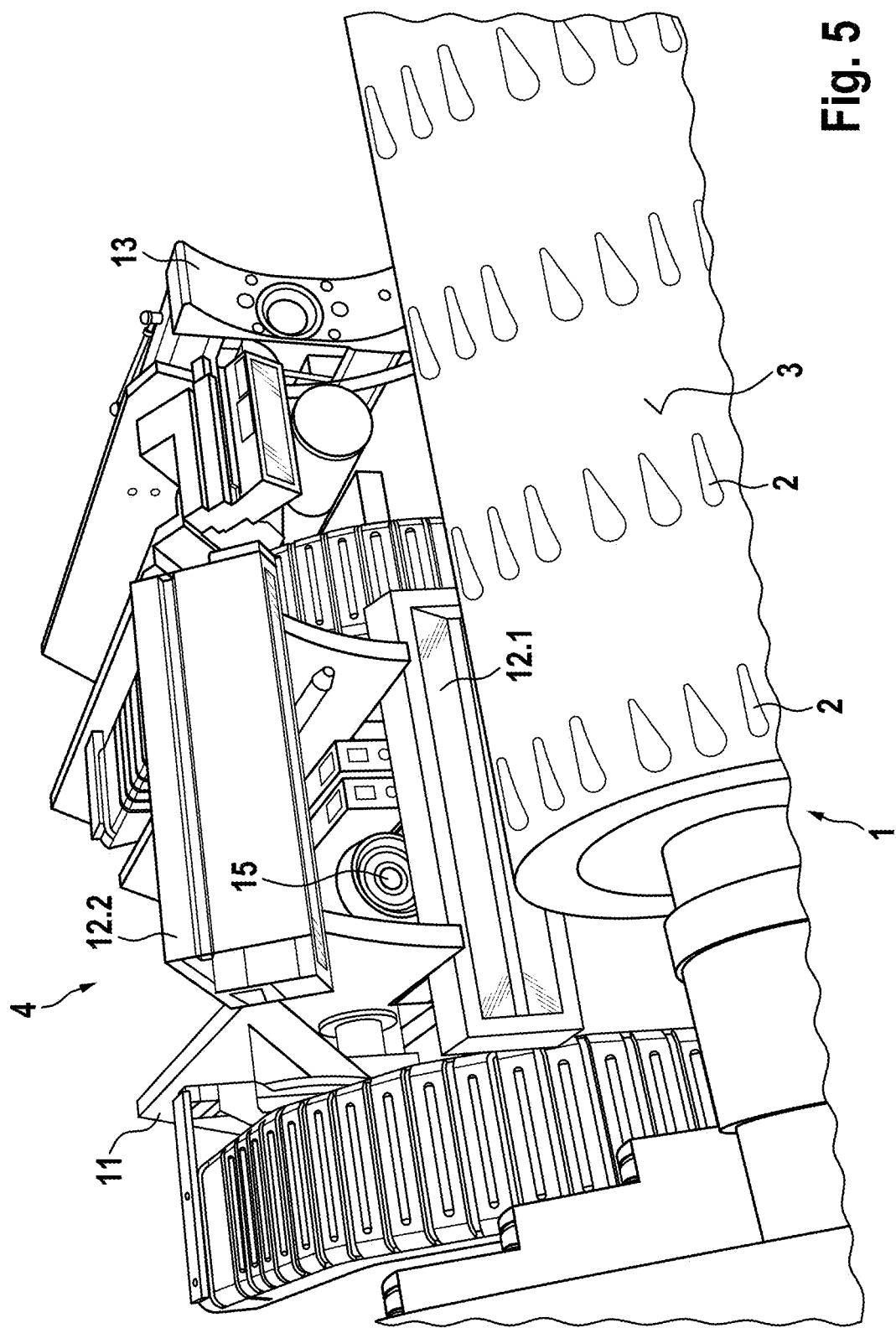
FIG. 5 shows an arrangement according to the invention when capturing a bright field image.

FIG. 5 shows the arrangement according to the invention when capturing a bright field image 5 with the rotating cylinder 1, which is mounted in the machine spindle and which has an engraving 2 provided in the cylinder surface 3. Opposite the cylinder surface 3, the optical capture unit 4 can be seen, wherein the line scan camera 15 accommodated in the optical capture unit 4 is directed at the cylinder surface 3 of the printing cylinder 1. It can be seen that the optical detection axis 6 of the camera 15 and the light source 12.1 are aligned perpendicular to the cylinder surface 3. The camera 15 is connected to the linear adjustment unit 10 via a supporting device 11 and can be moved parallel to the cylinder axis X via this unit. Furthermore, by means of the linear adjustment unit 10, the optical capture unit 4 is both height-adjustable and adjustable in distance relative to the printing cylinder 1. For the embodiment of capturing a bright field image 5 shown in FIG. 5, the illumination direction of the light source 12.1 is coaxial with the optical detection axis 6 and the light source 12.1 is arranged in the optical detection axis 6 in front of the camera lens. For this, the light source 12.1 has a semitransparent mirror, which on the one hand directs light onto the area of the cylinder surface 3 to be captured and through which on the other hand the light reflected from the cylinder surface 3 falls into the camera lens. In addition, the light source 12.2, which is intended for capturing the dark field images 7, can be seen, which is deactivated when capturing the bright field image 5. Like the camera 15, the light sources 12 are also attached to the supporting device 11. A cleaning device 13 is also connected to the supporting device 11 and arranged laterally next to the optical capture unit 4, which cleaning device cleans the cylinder surface 3 contactlessly with ionized compressed air between the individual bright field images 5. For this, the cleaning device 13 is moved by the linear adjustment unit 10 along the longitudinal axis X of the printing cylinder from one end to the other end of the printing cylinder 1 and meanwhile pressurized with compressed air. At the same time, the rotary spindle sets the printing cylinder 1 in rotation in order to apply the compressed air to all areas of the cylinder surface 3.

Figure 6:
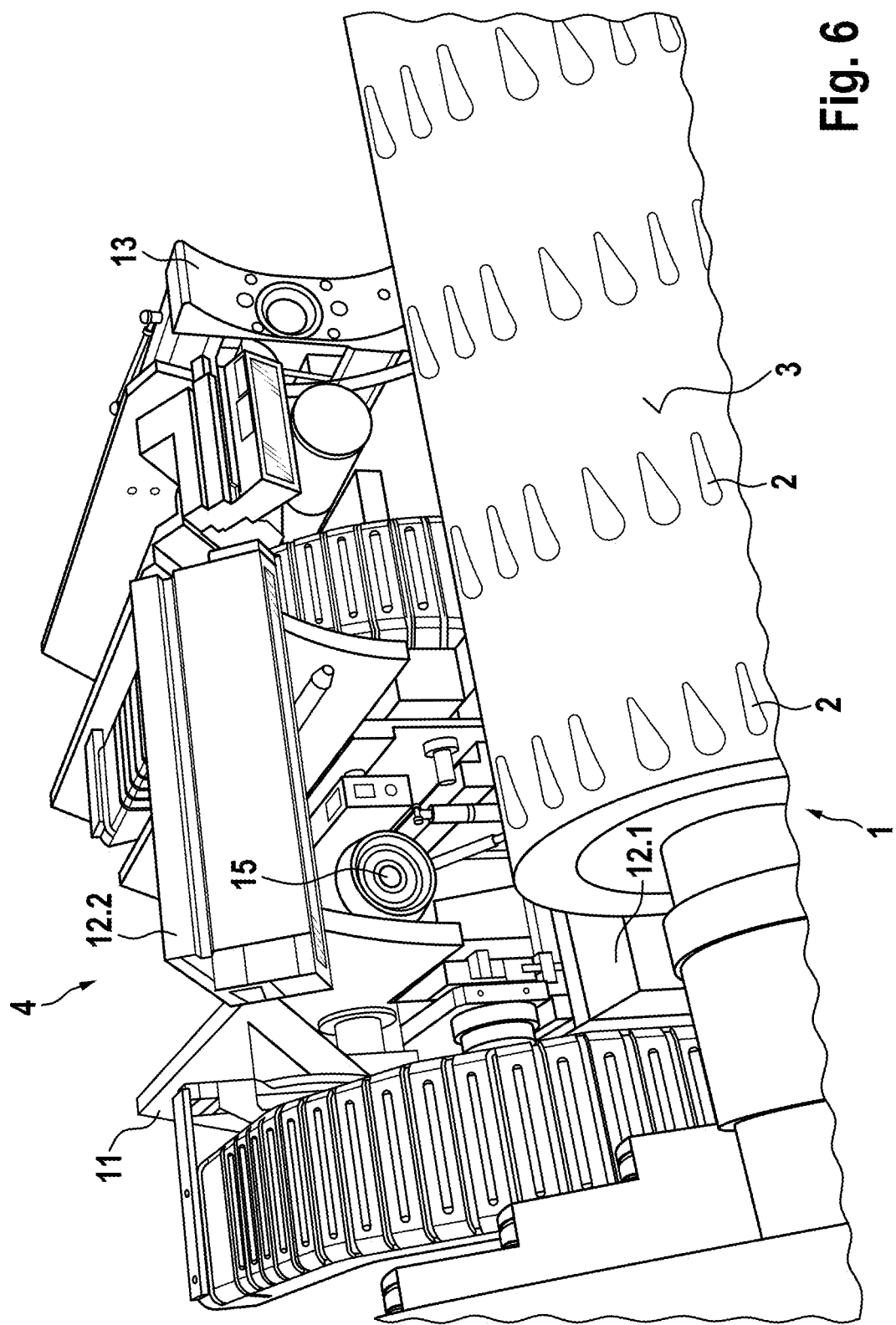
FIG. 6 shows the arrangement according to the invention when capturing a dark field image.

FIG. 6 also shows the arrangement according to the invention, wherein the light source 12.1 has now been pivoted away from the camera lens, since the light sources 12.2 used for the dark field image 7 are now activated, which are arranged at a different angle from the light source 12.1 to the optical detection axis 6. The dark field partial light sources 12.2.1, 12.2.2 are arranged symmetrically to the optical detection axis 6 diagonally above and diagonally below the area of the cylinder surface 3 to be captured.

Figure 7:
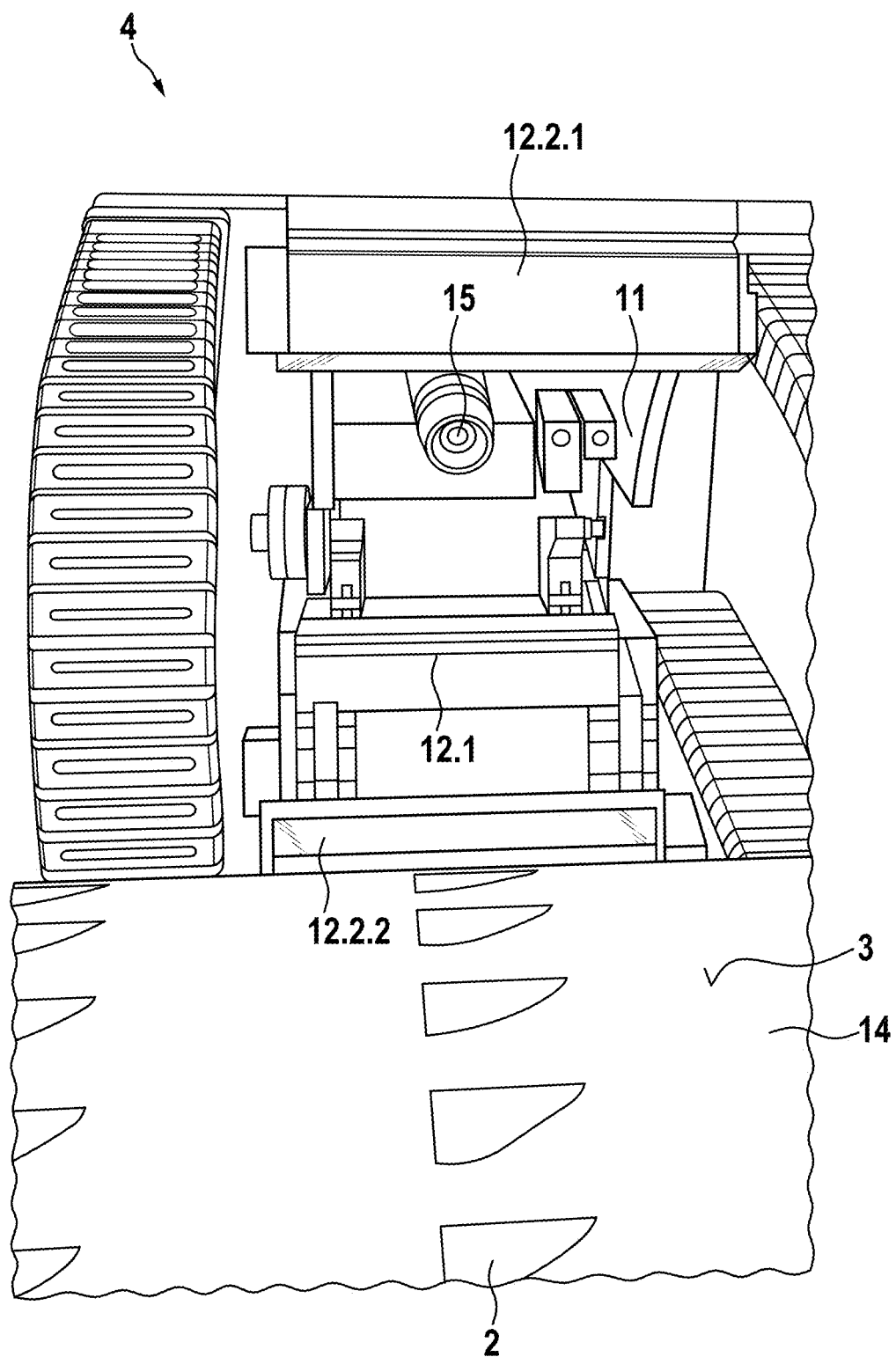
FIG. 7 shows a front view of the optical capture unit.

FIG. 7 shows a front view of the optical capture unit 4, the light sources 12 and the line scan camera 15 being attached to the supporting device 11, which can be adjusted parallel to the cylinder axis X via the linear adjustment unit 10. It can be seen that the line scan camera 15 is directed at the cylinder surface 3, which has multiple engraved areas 2 as well as a non-imaged area 14. It can also be seen that the light source 12.1 provided for generating a bright field is pivoted out of the optical detection axis 6 of the line scan camera 15, while the partial light sources 12.2.1 and 12.2.2 of the light source 12.2 responsible for generating dark field images are directed at their predetermined angle to the cylinder surface 3, so that the optical capture unit 4 in the shown figure is ready to generate a dark field image 7.

Figure 8:
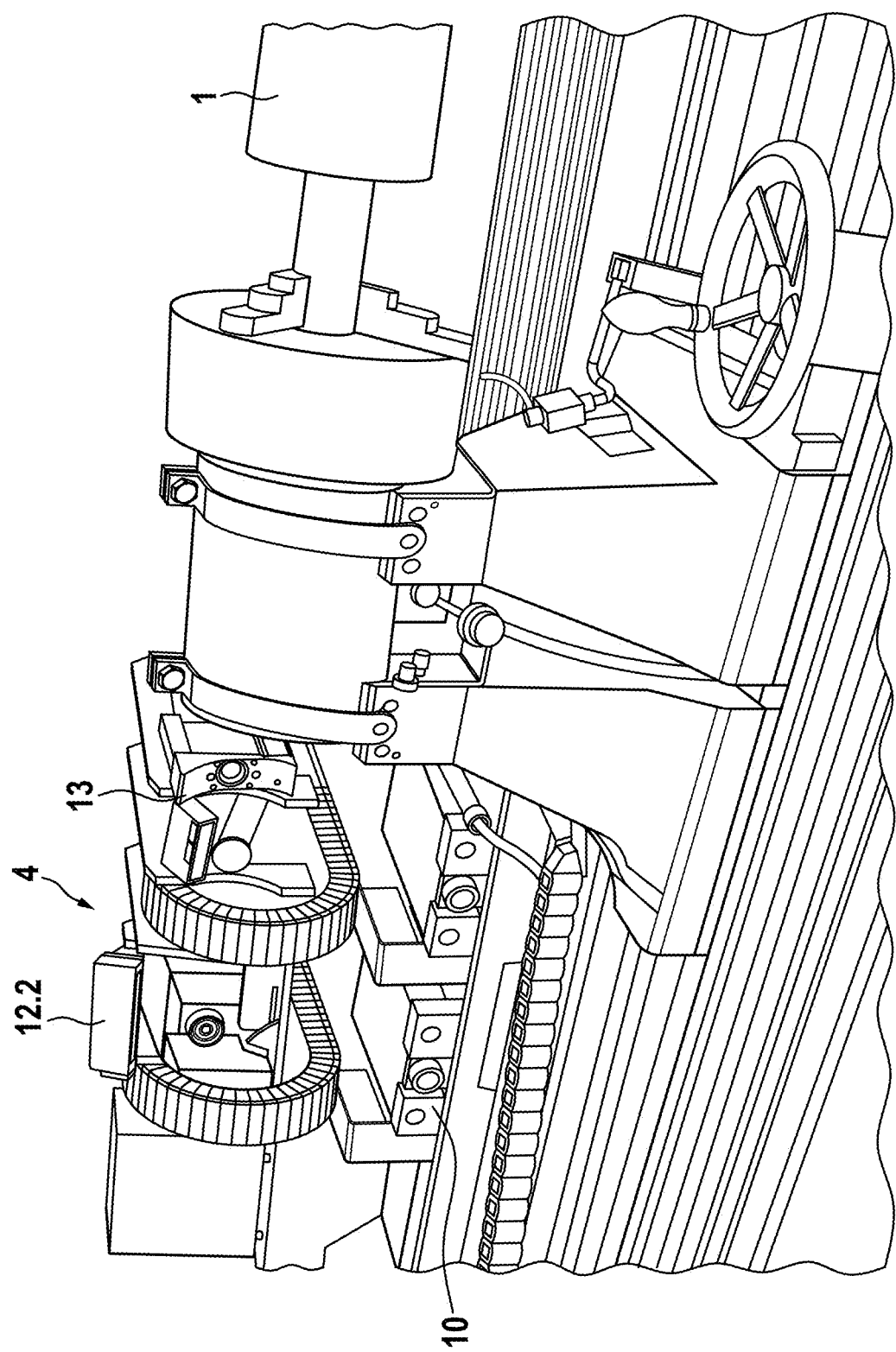
FIG. 8 shows a depiction of the optical capture unit with linear adjustment unit.

FIG. 8 shows the optical capture unit 4, which is moved out of the image capture area via the linear adjustment unit 10 parallel to the cylinder axis X and is in a mounting position offset to the machine spindle. In particular, the partial light sources 12.2.1, 12.2.2 arranged above and below the camera and the cleaning device 13 are visible.

Figure 9:
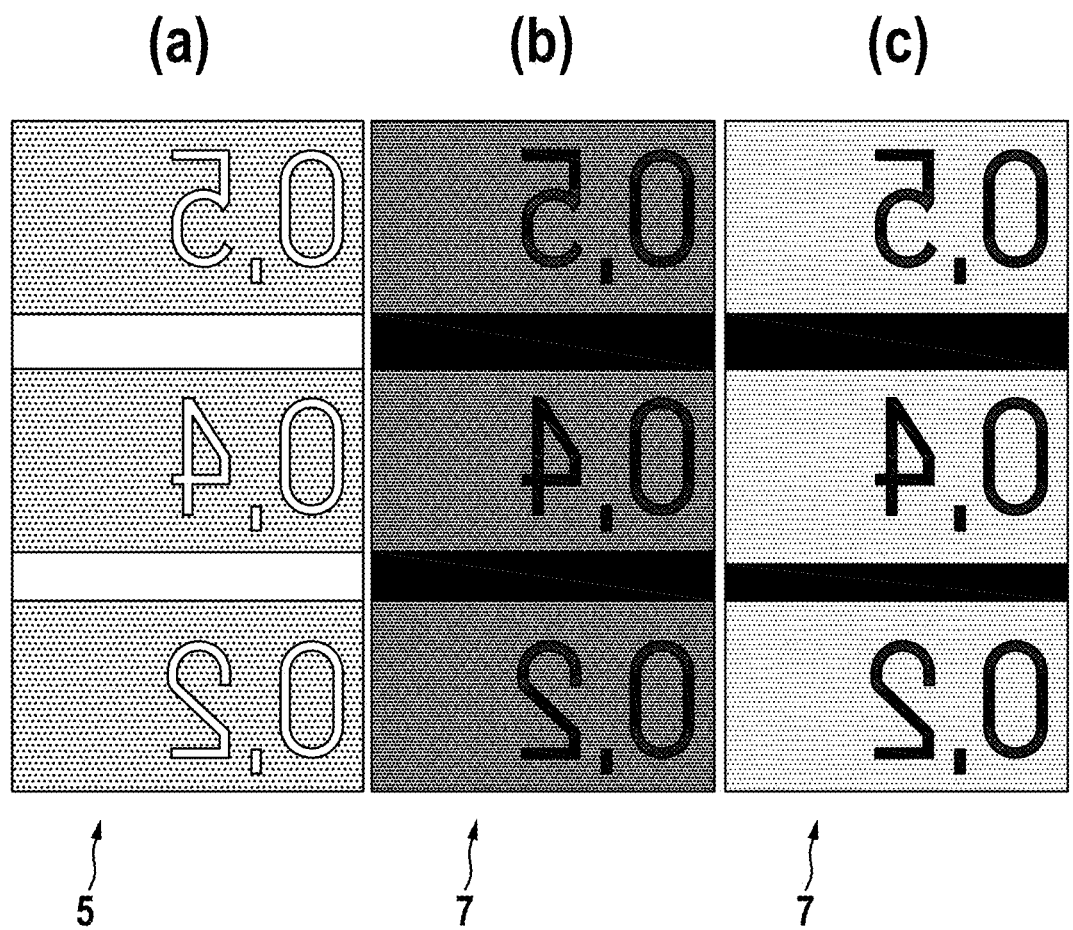
FIG. 9 shows exemplary depictions of bright and dark field images.

A line scan camera 15 is preferably used to capture the image data, which captures the rotating cylinder 1 columnwise. Two different illumination angles α are used to make different characteristics visible on cylinder 1. FIG. 9(*a*) shows a bright field image 5 in which the illumination 12 is aligned at the same angle as camera 15 and perpendicular to the cylinder surface 3. FIGS. 9(*b*) and 9(*c*) each show dark field images 7 of the same image section, with FIG. 9(*b*) captured at an angle of 30° to the optical detection axis 6 of camera 15 and FIG. 9(*c*) captured at an angle of 60° to the optical detection axis 6 of camera 15. It can be seen that different characteristics of the engraved cylinder surface 3 stand out more clearly due to the differently reflected light. In particular, the engraved areas appear dark and the non-printing areas light in the bright field image 5, whereas in the darkfield image 7, particularly the non-printing areas appear dark and the engraved areas appear slightly brighter depending on the angle of the illumination 12.

Figure 10:
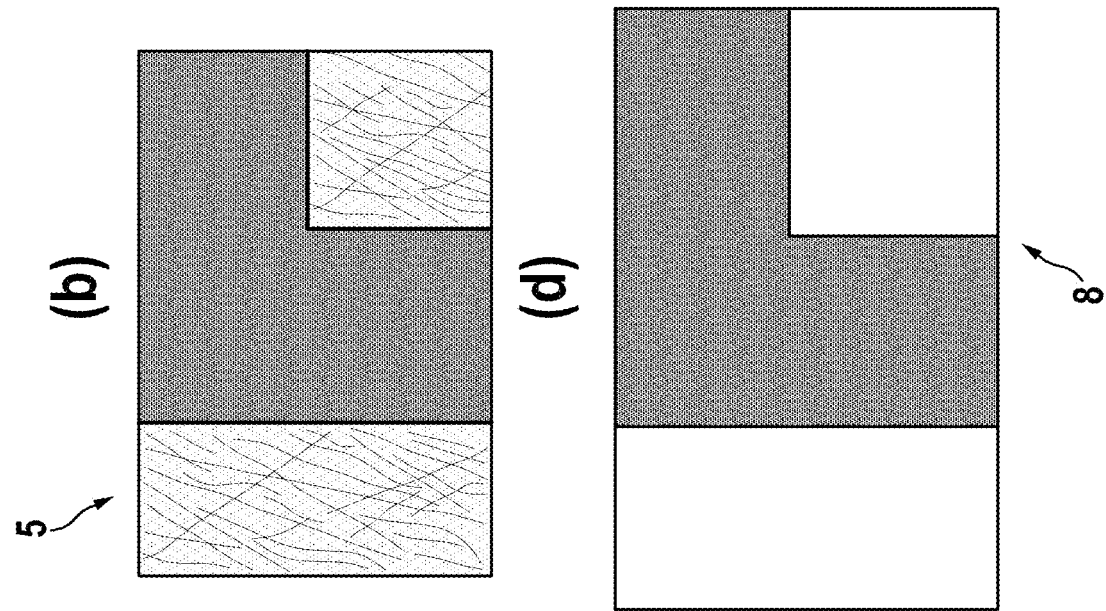
FIG. 10 shows exemplary depictions of bright field and dark field images, a white point shift and a print-like representation.
Figure 10:
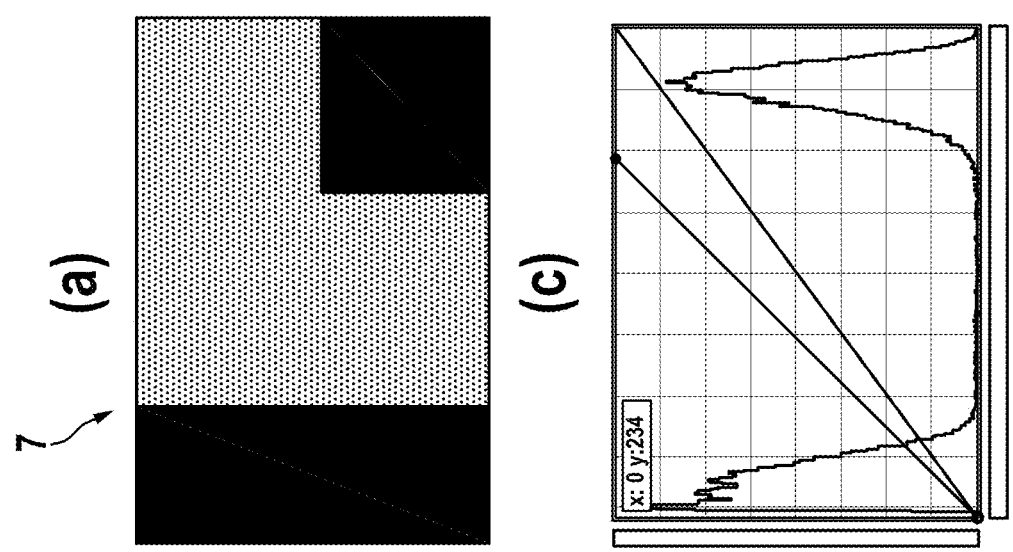

FIGS. 10(*a*) to 10(*d*) show exemplarily the generating of a mask for the brightness adjustment to generate a print-like representation 8. FIGS. 10(*a*), (*b*) and (*d*) each show the same image section. Here 10(*a*) shows a dark field image, 10(*b*) a bright field image and 10(*d*) the final result of the brightness adjustment or respectively the resulting, desired print-like representation 8. The brightness adjustment serves to ensure that the brightness values of the images correspond to those of the reproduction data or the engraving file in order to enable a better comparison during the later comparison. For this, the areas of the smooth, non-printing surface and the image-giving recesses must be processed with different filter parameters. In order to ensure a separation of these areas, a binary image is derived from the dark field, since there a clearer separation is possible due to the condition of the image compared to the bright field image 5. In the areas which are black in the dark field, the average brightness value is now determined in the bright field image 5. Using this value, the brightness is adjusted by shifting the white point. The process of white point shifting is shown in FIG. 10(*c*) as an example. This results in a print-like representation without eliminating essential characteristics due to excessive overexposure.

An alternative computation of the brightness adjustment by white point shift can also be realized without generating a binary mask from the dark field. For this, white point adjustment is performed via peak detection in the histogram. For this, one or more of the bright field images 5 are used instead of the dark field image 7. In the histogram, the local maximum in the higher or brighter range is sought. This range corresponds to the non-printing or non-imaged area 14 displayed brighter in the bright field image 5. The local maximum corresponds approximately to the median of the area. After determining this local maximum, various algorithms can be used to calculate the distance by which the white point is to be shifted to achieve the print-like representation 8.

Figure 11:
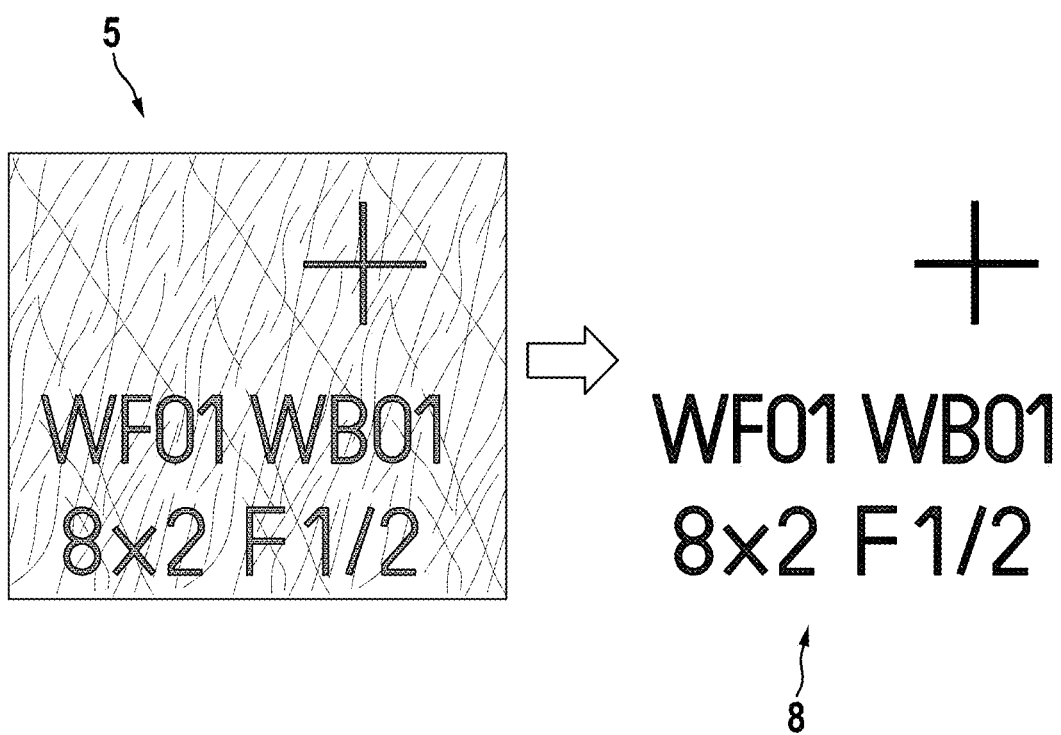
FIG. 11 shows exemplary depictions of a bright field image and a print-like representation.

FIG. 11 shows in another example the comparison of a bright field image 5 with a print-like representation 8 generated from it and from a dark field image of the same image section. Compared to the bright field image 5, the print-like representation 8 is significantly brighter, particularly in the non-printing areas. This is due to the fact that while the grooves of the polishing process are still clearly visible in the non-printing area of bright field image 5, they are so shallow that they are effectively not visible in the later printed product.

Figure 12:
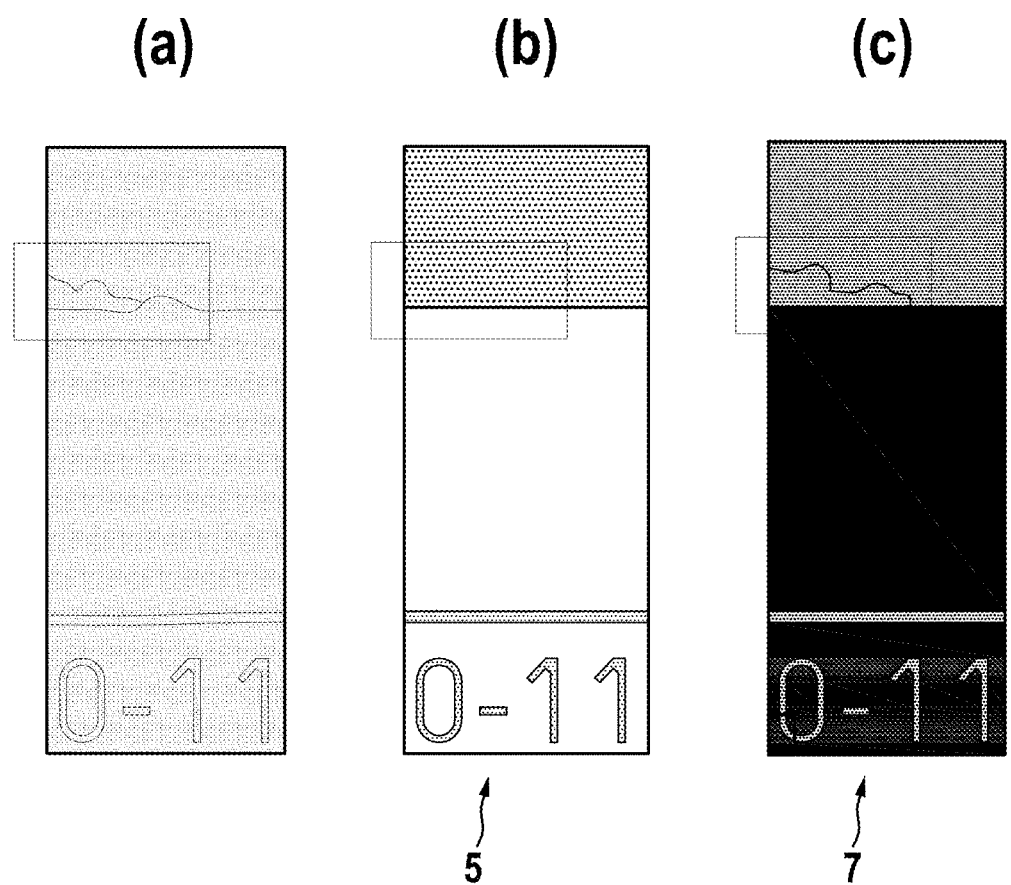
FIG. 12 shows comparative depictions of a printout, a bright field image and a dark field image.

FIGS. 12(*a*) to (*c*) illustrate a further advantage of using both bright field images 5 and dark field images 7. FIG. 12(*a*) shows a defective print result, FIGS. 12(*b*) and 12(*c*) each show a bright field image 5 and a dark field image 7 of the same image section. Due to the different reflection angles of both illumination methods, different characteristics are made visible on cylinder 1. In the bright field, recesses are generally very dark, as most of the light here is not reflected into the optics. Smooth surfaces, on the other hand, reflect the light directly back into the optics. In the dark field, the opposite is true, since the recesses are brighter here, since more light enters the optics due to the cell geometry. In conjunction with the bright field images 5, incorrectly produced cells can therefore also be detected. Furthermore, it is also possible to make deformations and clogging of the cells visible. In addition, production defects can be detected in the non-engraved areas.

Figure 13:
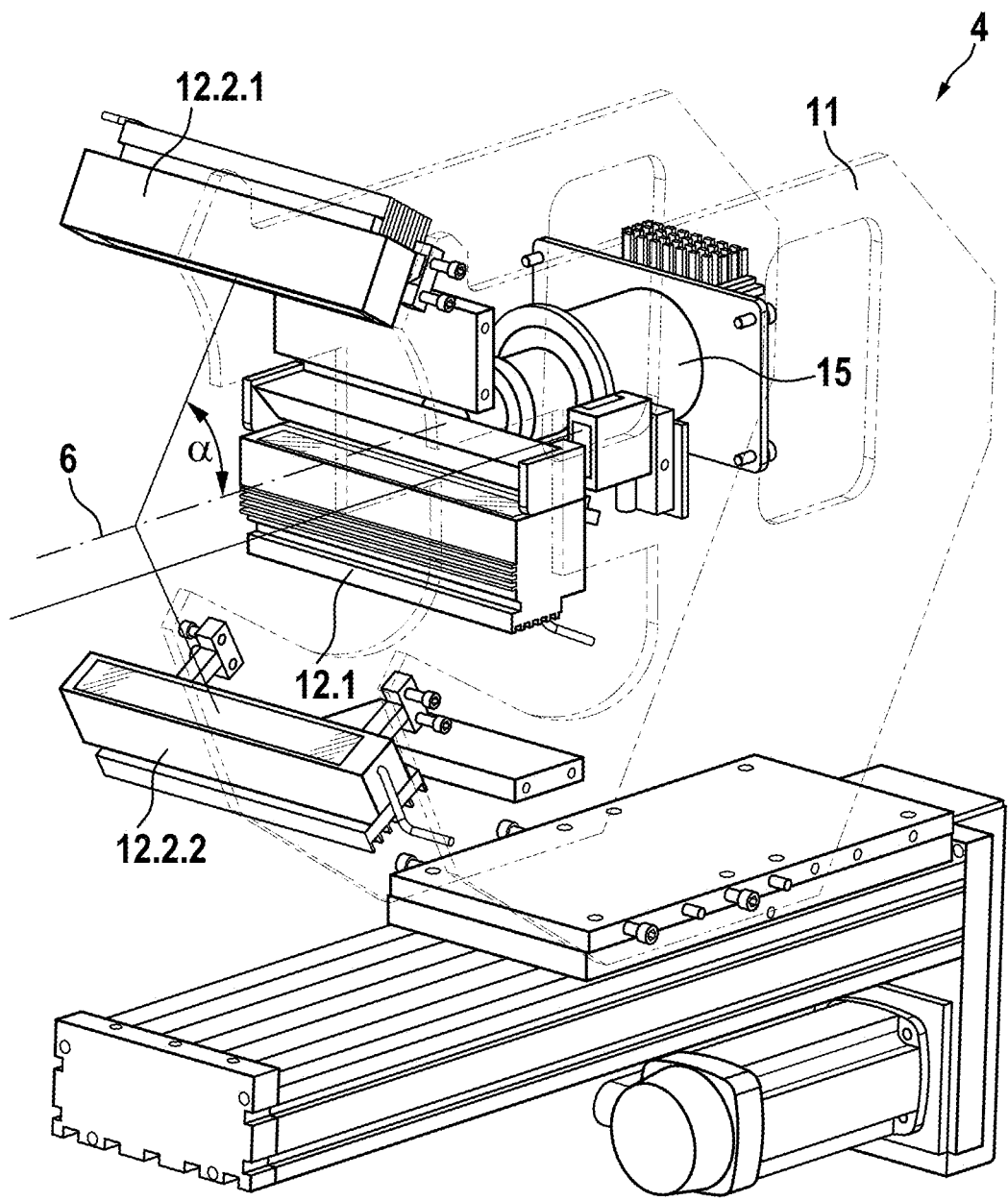
FIG. 13 shows an embodiment of the optical capture unit with a light source in the optical detection axis.
Figure 14:
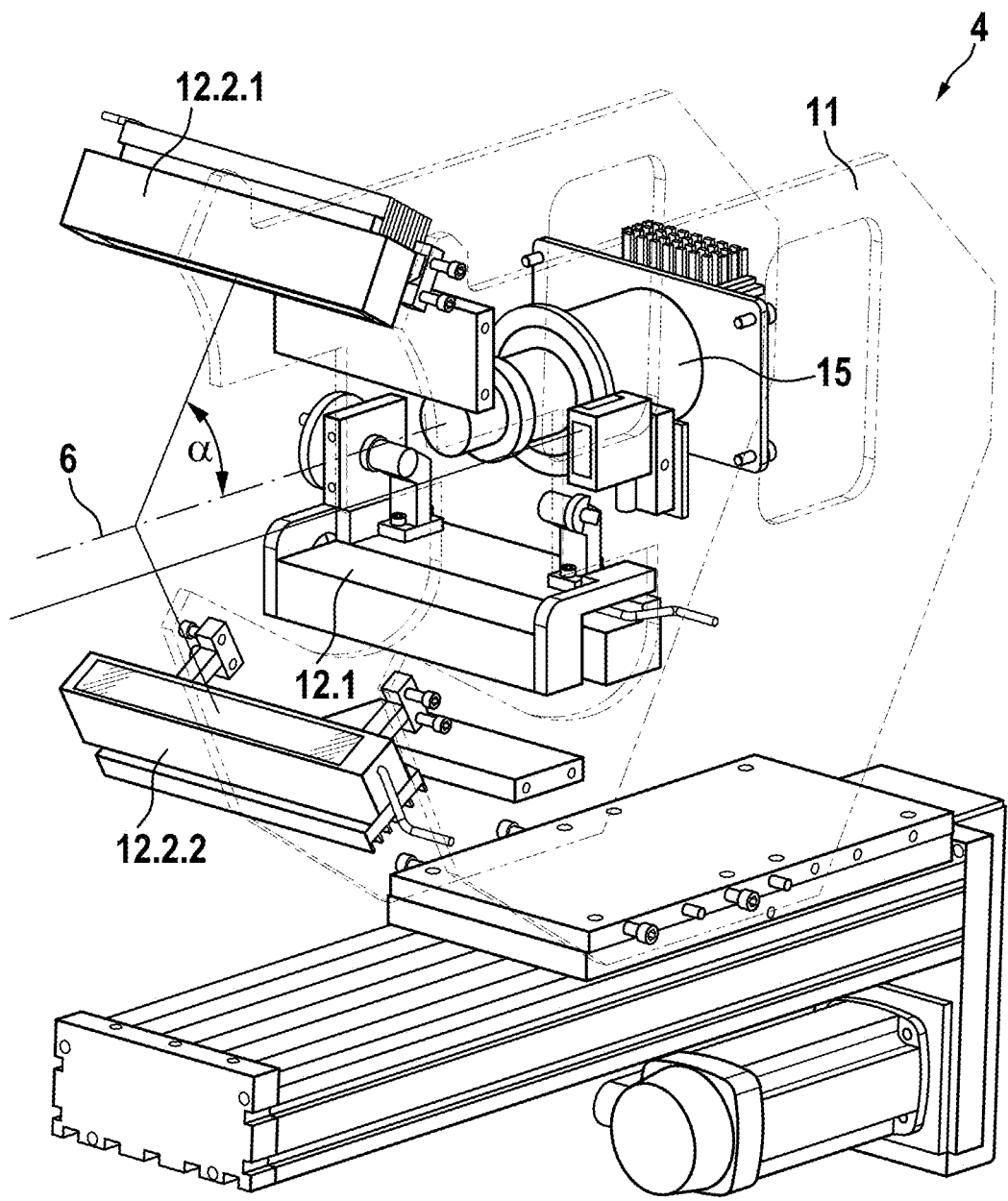
FIG. 14 shows an embodiment of the optical capture unit with a light source pivoted out of the optical detection axis.

FIGS. 13 and 14 show an embodiment of the optical capture unit 4. The upper and lower LED illumination lines 12.2.1, 12.2.2 is mounted at a fixed angle α and are intended for illumination of dark field images 7. In front of the lens of camera 15 there is a coaxial light 12.1 for the illumination of bright field images 5, which can be pivoted via a pneumatic drive, as shown in FIG. 14. The pivotable coaxial light 12.1 is advantageous because the semi-transparent mirror in the coaxial light absorbs about 50% of the light intensity and the dark field method also requires very bright illumination. Thus, the coaxial light 12.1 can be pivoted out of the optical detection axis 6 when the coaxial light 12.1 is deactivated and an increased light intensity is required for the dark field images 7.

The features of the invention disclosed in the above description, in the drawings and in the claims may be essential for the realization of the invention, either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for checking a printing cylinder for defects in an engraved cylinder surface of the printing cylinder, comprising the steps:
  capturing a first and at least one further digital image of a cylinder surface of a printing cylinder by means of an optical capture unit, wherein the cylinder surface is cleaned before capturing the at least one further image,
  comparing the digital images each with a digital engraving master of the printing cylinder, the comparing comprising:
    determining deviations between each of the digital images and the digital engraving master, and
    checking the determined deviations for matching deviations between the digital images,
  wherein a pseudo defects is concluded if no matching deviations between the digital images have been detected when comparing, and wherein an engraving defect on the printing cylinder is concluded in the case of matching deviations.

2. The method according to claim 1, in which the cleaning of the cylinder surface is carried out manually or contactlessly and preferably by applying ionized compressed air, wherein dust particles are removed from the cylinder surface or at least redistributed on the cylinder surface.

3. The method according to claim 1, in which the capturing of the digital images comprises rotating the printing cylinder, capturing the rotating printing cylinder columnwise using a camera, preferably a line scan camera, and moving the camera relatively in the axial direction of the printing cylinder.

4. The method according to claim 1, in which capturing the first and each further digital image comprises the capturing of at least one bright field image in which the cylinder surface is illuminated at an angle between 0° and 30° to the optical detection axis of the optical capture unit.

5. The method according to claim 1, in which the capturing of the first and each further digital image comprises capturing at least one dark field image in which the cylinder surface is illuminated at an angle (a) between 30° and 60° to the optical detection axis of the optical capture unit.

6. The method according to claim 1, further comprising the step:
  generating a print-like representation from at least one bright field image of the cylinder surface and at least one dark field image of the cylinder surface, the generating comprising:
    extracting a mask for a non-printing area of the printing cylinder from black areas of the dark field image, and
    applying the mask to the non-printing area of the printing cylinder in the bright field image to adjust the brightness by shifting the white point.

7. The method according to claim 6, in which a binary image is derived from the dark field image for extracting the mask, wherein in the regions which are black in the dark field image, the average brightness value is determined in the bright field image on the basis of which a brightness adjustment by means of white point shift is carried out.

8. The method according to claim 1, further comprising the step:
  generating a print-like representation from at least one bright field image of the cylinder surface, said generating comprising:
    determining a local maximum of a bright range in the brightness histogram of the at least one bright field image, which bright range is bright compared with a darker range, the bright range corresponding to a non-printing surface area of the printing cylinder;
    determining a distance by which the white point is shifted, preferably a multiple of a standard deviation; and
    shifting the white point in the at least one bright field image by the determined distance.

9. The method according to claim 1, in which at least one of the light sources of the optical capture unit is oriented towards the cylinder surface at an angle (a) of 30° to 60° to the optical detection axis of the optical capture unit.

10. The method according to claim 9, in which the at least one light source has two partial light sources arranged opposite and symmetrically to the optical detection axis.

11. The method according to claim 1, in which the optical capture unit is further adjustable in two axes perpendicular to the cylinder axis relative to the cylinder surface.

12. The method according to claim 1, in which the optical capture unit comprises a line scan camera which is designed to capture the rotating printing cylinder columnwise.

* * * * *